3,477,993
VAPOR-PHASE BASE CLEAN-UP OF POLYOXYMETHYLENE

Richard Glenn Alsup and Glenn Frederick Leverett, Vienna, W. Va., assignors to E. I. du Pont de Nemours and Company, Wilmington, Del., a corporation of Delaware
No Drawing. Filed Apr. 1, 1966, Ser. No. 539,269
Int. Cl. C08g 1/22
U.S. Cl. 260—67          10 Claims

ABSTRACT OF THE DISCLOSURE

A process for stabilizing polyoxymethylene by removing a base-unstable fraction which consists of heating polyoxymethylene in the presence of guanidine base, e.g. guanidine, at a temperature from 20° C. below the melting point of the polymer up to, but not including, the melting point wherein the guanidine base is carried to the polymer by a non-acidic vapor medium, e.g. water vapor or ammonia.

---

This invention relates to polyoxymethylenes, and, more specifically, to stabilization thereof by a vapor-phase base treatment which removes an unstable fraction of the polymer.

The term polyoxymethylene is used herein to mean both acetal homopolymer diethers and acetal copolymers, wherein alkylene groups containing at least one carbon-to-carbon linkage are present in the backbone of said copolymers to extent of 0.5–5.0 mole percent.

The process of the present invention comprises treating a solid polyoxymethylene with a guanidine base in a non-acidic vapor medium at elevated temperature. The vapor medium carries the guanidine base to the polymer and thereafter carries off the degradation products of the base-unstable polymer chains (formaldehyde from the acetal homopolymers, for example), leaving behind a polymer of enhanced base stability, which is recovered without requiring filtration, washing, and drying steps.

The guanidine base employed in the process of this invention can be guanidine itself or a derivative of guanidine, represented by the formula

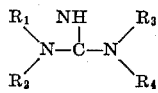

wherein $R_1$, $R_2$, $R_3$, and $R_4$ are radicals selected from the class consisting of hydrogen, alkyl groups of 1–4 carbon atoms, and the phenyl group. Illustrative of useful guanidine derivatives are 1,3-diphenylguanidine, tetramethylguanidine, 1,1-dimethylguanidine, and butylguanidine. Generally, the effectiveness of a guanidine derivative in the stabilization reaction decreases with increasing substitution of an alkyl or phenyl radical for hydrogen on the amido nitrogens. Therefore, guanidine derivatives of a lower degree of substitution are preferred in this process to highly substituted derivatives. Other useful guanidine bases include cyanoguanidine and biguanidine.

A compound which reacts under the conditions of this process to form guanidine or a guanidine derivative can be employed. For example, cyanamide, when introduced into the reaction, forms guanidine.

Salts of guanidine bases can be employed advantageously in this invention. For example, a guanidine salt such as guanidine carbonate or 1,1-dimethylguanidine sulfate can be introduced into the reactor. Guanidine can be then generated in the reactor by thermal decomposition of guanidine carbonate. 1,1-dimethylguanidine sulfate can be heated in the presence of calcium oxide to liberate 1,1-dimethylguanidine.

The preferred guanidine base employed in the process of this invention is guanidine itself. A convenient way in which guanidine can be introduced into this reaction is by loading guanidine carbonate into the reactor.

The vapor-phase medium employed in the process of this invention to carry the guanidine base to the polymer is a non-acidic material. Illustrative of such media are nitrogen, ammonia, argon, alcohols of the formula ROH, wherein R is an alkyl radical of 1–4 carbon atoms, ethers of the formula $R_1$—O—$R_2$, wherein $R_1$ and $R_2$ are alkyl radicals of 1–4 carbon atoms, and hydrocarbons of 1–8 carbon atoms. One of these vapor media can be employed alone in this process, or two or more media can be combined. The combination of water, nitrogen, and ammonia, for example, can be advantageously employed. The preferred vapor media in the process of this invention are nitrogen and water.

The relative amounts of polyoxymethylene and guanidine base can be varied widely depending upon, among other things, the particular polymer and base employed, the pressure of the vapor medium and the reaction temperature. In general, there can be 0.00001 to 10 parts (by weight) of guanidine base per part of polymer. Generally, less than one part of guanidine base per part of polymer is preferred.

The time, temperature, and pressure of the process can be varied. Generally, the pressure of the system can be varied widely, for example, 10 mm. to several atmospheres. A pressure of near one atmosphere is preferred. The polymer is heated to a temperature in the range from about 20° C. below the melting point of the non-degradable (base stable) fraction of the polymer up to, but not including, the melting point thereof, for a period of between 10 minutes and 4 hours or more.

In a typical embodiment of the process of this invention, the reactor is fitted with a permeable member which separates the interior of the reactor into two chambers. The polymer is loaded onto the permeable member. The guanidine base (or its precursor) is placed in the reactor chamber on the opposite side of the permeable member. The polymer and the guanidine base are held at elevated temperature, and a stream of the non-acidic vapor medium is passed through the chamber containing the guanidine base and carries the guanidine base through the permeable member and the polymer. The unstable polymer is thus decomposed and the decomposition product (or products) is carried off in the vapor stream. Minor entrainment of a condensed guanidine base in the vapor medium is possible in this process and is within the purview of this invention.

In order that the invention may be better understood, the following detailed examples are given in addition to the examples already given above.

The base stability of the polymeric product of this process as referred to in the examples was determined by placing 2 parts (by weight) of stabilized polyoxymethylene in 1 part of tri-n-propylamine and 49 parts of benzyl alcohol. The mixture was sparged with nitrogen at room temperature for 15 minutes, heated up to 160° C. to dissolve the polymer, then sparged to 160° C. for 30 minutes with a slow stream of nitrogen. The flow of nitrogen was then increased and at the same time the solution was allowed to cool. The polymer precipitated while the solution temperature was still above 100° C., was filtered off, washed with acetone, and vacuum dried at 70° C. until it reached constant weight. Base stability is calculated as the weight of polymer recovered divided by the initial weight of polymer multiplied by one hundred.

Example I

A. The polyoxymethylene employed in this process was a polyoxymethylene diether. A homopolymer was prepared according to the procedure of Example I of U.S. Patent 2,994,687, issued to H. H. Goodman, Jr., on Aug. 1, 1961, and then treated as follows to form the diether: 900 pounds of nitration grade toluene, 105 pounds of trimethylorthoformate, and 5.6 pounds of dimethyl sulfate were charged to a 300-gallon autoclave. The autoclave was closed and heated with agitation to a temperature of 145° C., then held at that temperature for 30 minutes. The autoclave was cooled and the contents filtered. The solids were then reslurried twice with 1000 pounds of acetone, washed with demineralized water to remove residual dimethyl sulfate, washed again with acetone and then vacuum dried at 120° C. for 16 hours. The crude polyoxymethylene diether thus obtained was 95% base stable.

B. The base stabilization of the polymer was conducted in a reactor fitted with a concentric horizontally-disposed fritted glass disc, a gas inlet below the disc, and an outlet above the disc. Two parts (by weight) of the crude polyoxymethylene diether were placed on the disc and 0.5 part of guanidine carbonate in the chamber below the disc. The entire reactor was immersed in a 170° C. oil bath for 30 minutes, while nitrogen was passed through the reactor at a rate of 1500 ml./minute. The reactor and contents were then cooled. The product (1.90 parts) had a base stability of 99%, indicating almost complete removal of chains not terminated by methoxy groups.

Example II

The crude polyoxymethylene diether of Example I was used, as was the base stabilization procedure therein, except for the following modifications.

A guanidine precursor, cyanamide (0.5 part), was placed in the reactor. The vapor medium was a mixture of nitrogen and anhydrous ammonia, each at a flow rate of 800 ml./minute. After reaction time of 60 minutes, 1.91 parts of product having a base stability of 99% was recovered.

Example III

The crude polyoxymethylene diether of Example I was used, as was the base stabilization procedure of Example I, except as noted below.

The guanidine base charged into the reactor was cyanoguanidine (0.5 part) instead of guanidine carbonate. After a 60-minute reaction time, there was recovered 1.92 parts of product having a base stability of greater than 99%.

Example IV

The crude polyoxymethylene diether of Example I was used, as was the base stabilization procedure of Example I, except for the following modifications.

1,3-diphenylguanidine (0.5 part) was charged into the reactor below the glass disc. After a 90-minute reaction there was recovered 1.88 parts of polymer with a base stability of 99%.

Example V

The crude polyoxymethylene diether and guanidine base of Example I were used, as was the base stabilization procedure thereof, except that the vapor medium was a mixture of ammonia and water vapor, at flow rates of 300 and 400 ml./minute, respectively. There was recovered 1.92 parts of product having a base stability of greater than 99%.

Example VI

The polymer was a copolymer of formaldehyde and dioxolane containing 1.1 mole percent dioxolane and with a base stability of 91.4%. The guanidine base and the stabilization procedure were the same as those of Example I except that the temperature was 160° C. There was recovered 1.8 parts of polymer with a base stability of greater than 99%.

The foregoing detailed description has been given for clearness of understanding only, and no unnecessary limitations are to be understood therefrom. The invention is not limited to the exact details shown and described since obvious modifications will occur to those skilled in the art.

We claim:

1. A process for the stabilization of polyoxymethylene by the removal of a base-unstable fraction therein, which comprises heating polyoxymethylene at a temperature in the range from 20° C. below the melting point of the nondegradable fraction of the polyoxymethylene up to, but not including, the melting point thereof in the presence of a guanidine base selected from the class consisting of cyanoguanidine, guanidine carbonate, biguanide, 1,3-diphenyl guanidine, cyanamide and guanidine, carried in a non-acidic vapor medium.

2. A process according to claim 1 wherein said vapor medium is nitrogen.

3. A process according to claim 1 wherein said vapor medium is ammonia.

4. A process according to claim 1 wherein said vapor medium is water.

5. A process according to claim 1 wherein said vapor medium is a compound of the formula ROH, wherein R is an alkyl radical containing 1–4 carbon atoms.

6. A process according to claim 1 wherein said vapor medium is a compound of the formula $R_1$—O—$R_2$, wherein $R_1$ and $R_2$ are alkyl radicals containing 1–4 carbon atoms.

7. A process according to claim 1 wherein said vapor medium is a hydrocarbon of 1–8 carbon atoms.

8. A process according to claim 1 wherein the polyoxymethylene is heated for a period of 10 minutes to 4 hours at substantially atmospheric pressure, and wherein polyoxymethylene and guanidine base are present in a ratio of 0.00001–10 parts by weight of said base per part of polyoxymethylene.

9. A process according to claim 8 wherein the guanidine base is guanidine.

10. A process according to claim 9 wherein said guanidine is introduced into the reaction system as guanidine carbonate and is generated thermally from said guanidine carbonate.

References Cited

UNITED STATES PATENTS

| | | |
|---|---|---|
| 3,174,948 | 3/1965 | Wall et al. |
| 3,219,623 | 11/1965 | Berardinelli et al. |
| 3,235,531 | 2/1966 | Walker. |
| 3,301,821 | 1/1967 | Asmus et al. |

FOREIGN PATENTS

| | | |
|---|---|---|
| 603,786 | 5/1961 | Belgian. |

HAROLD D. ANDERSON, Primary Examiner

L. M. PHYNES, Assistant Examiner

U.S. Cl. X.R.

260—45.9